United States Patent [19]

Sugawara et al.

[11] Patent Number: 5,652,822
[45] Date of Patent: Jul. 29, 1997

[54] VIDEO SIGNAL RECORDING AND REPRODUCING APPARATUS

[75] Inventors: Kazuaki Sugawara; Hideo Ito; Yoshio Koizumi, all of Tokyo, Japan

[73] Assignee: Pioneer Electronic Corporation, Tokyo, Japan

[21] Appl. No.: 576,169

[22] Filed: Dec. 21, 1995

Related U.S. Application Data

[63] Continuation of Ser. No. 205,487, Mar. 3, 1994, abandoned.

[30] Foreign Application Priority Data

Mar. 4, 1993 [JP] Japan .................................. 5-043950

[51] Int. Cl.⁶ .................................................. H04N 5/76
[52] U.S. Cl. .............................. 386/46; 386/92; 358/906
[58] Field of Search .............................. 358/335, 342, 358/909.1, 906; 360/33.1, 35.1; 348/159, 565; 386/46, 906, 92, 107, 117; H04N 5/76

[56] References Cited

U.S. PATENT DOCUMENTS

| | | | |
|---|---|---|---|
| 4,761,688 | 8/1988 | Hakamada | 348/565 |
| 4,802,025 | 1/1989 | Shinada | 358/337 |
| 4,858,032 | 8/1989 | Okada et al. | 358/335 |
| 4,943,854 | 7/1990 | Shiota et al. | 358/342 |
| 4,956,725 | 9/1990 | Kozuki et al. | 358/335 |
| 5,097,348 | 3/1992 | Suetaka | 358/335 |
| 5,150,212 | 9/1992 | Han | 348/706 |
| 5,335,014 | 8/1994 | Elberbaum | 348/159 |

*Primary Examiner*—Thai Tran
*Assistant Examiner*—Huy Nguyen
*Attorney, Agent, or Firm*—Fish & Richardson P.C.

[57] ABSTRACT

A video signal recording and reproducing apparatus replaces at least one of a group of a predetermined number of frames of a main signal from one video camera to a sub signal frame from another video camera on the same time base as that of the main signal and records, and upon reproduction, executes the recording video signal by an ordinary reproducing process and reproduces and displays the main signal and still reproduces the intermittent sub signal frames, thereby reproducing the sub signal like a frame sending. The recording and reproducing apparatus sets one of the video signals which are obtained from two or more video cameras into the main signal and sets the other remaining video signals into the sub signals and records those main and sub signals and conveniently distributes those signals and reproduces.

6 Claims, 5 Drawing Sheets

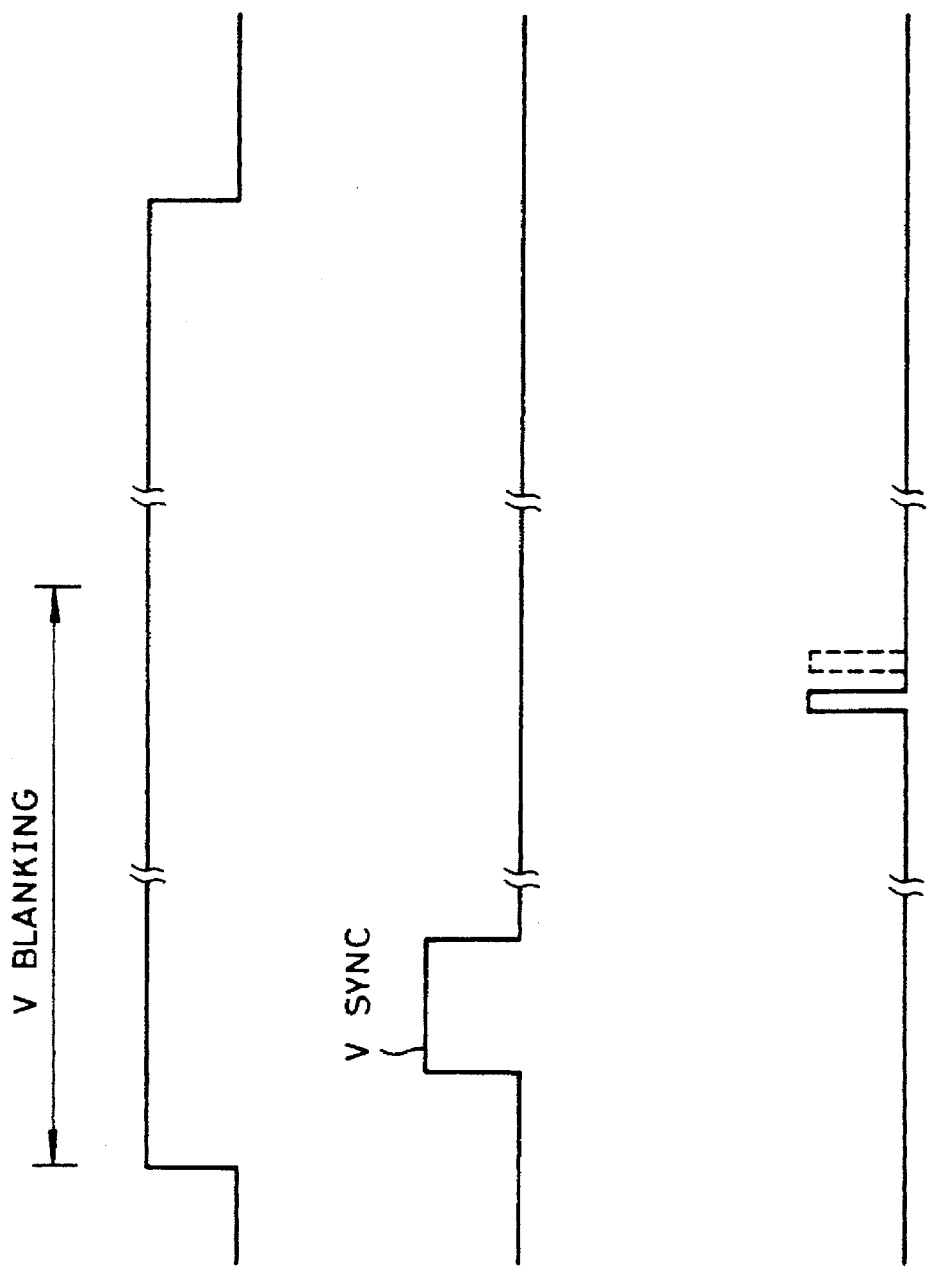

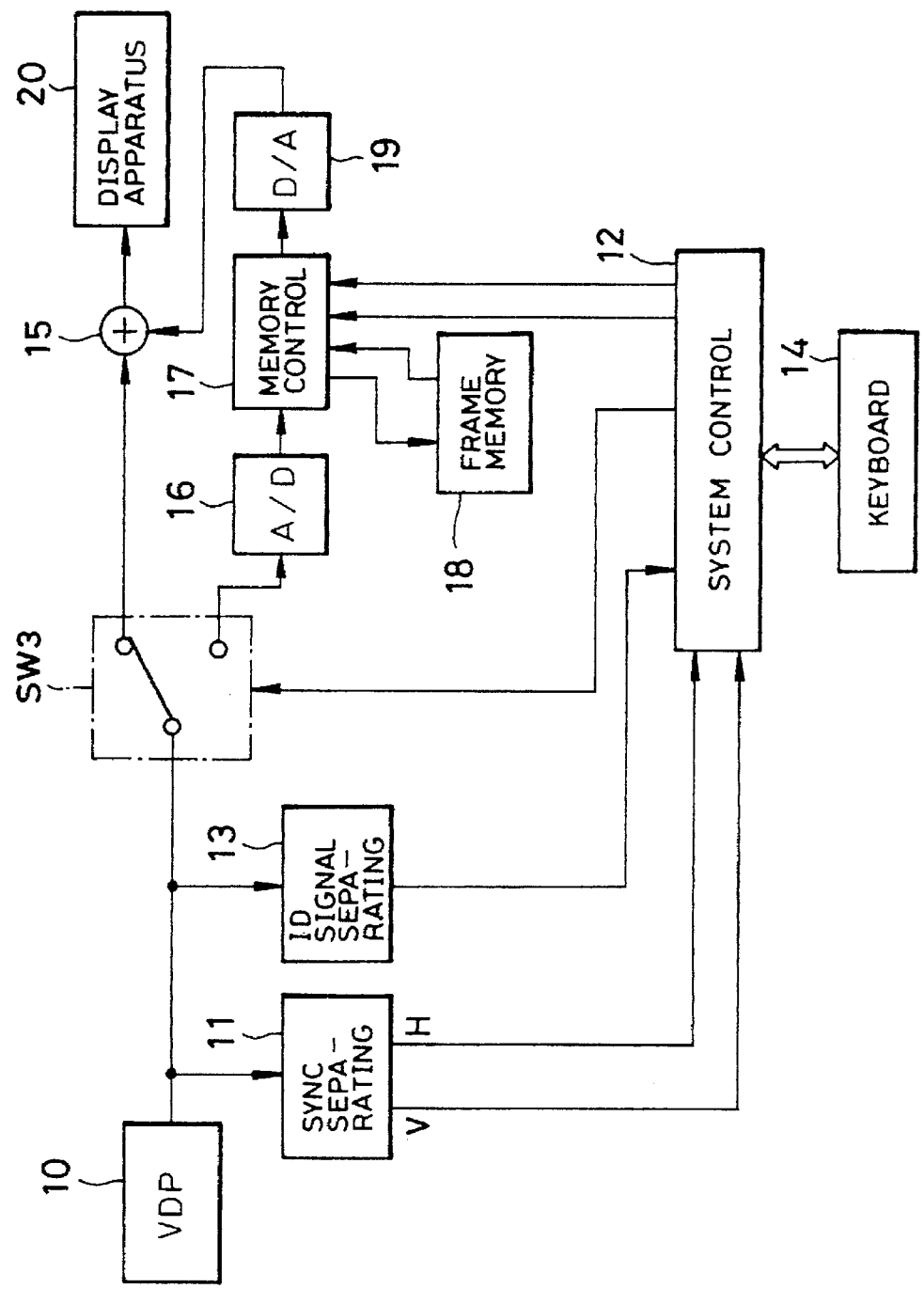

VIDEO SIGNAL RECORDING AND REPRODUCING APPARATUS

This application is a continuation of U.S. application Ser. No. 08/205,487, filed Mar. 3, 1994, now abandoned.

BACKGROUND OF THE INVENTION

1. Field of the Invention

The invention relates to an apparatus for combining a plurality of video signals obtained from a plurality of video cameras, obtaining a composite video signal, recording the signal, and reproducing a plurality of video signals thereafter.

2. Description of the Prior Art

In a baseball relay television broadcast, for example, while original video signals from a plurality of video cameras are monitored, the operating mode is switched to the manual mode, those video signals are edited and are multiplexed to a carrier as broadcasting video signals. There are parts of the original video signals which are cut during editing such broadcasting video signals. For example, in the case where a series of edited; video signals obtained for an interval from the throwing motion of a pitcher to the swinging of a batter and a movement of a ball were broadcasted, original video signals indicative of the motions from the swing of the batter to the end of the running operation are to be left.

In other words, it is desirable that at least a part of the original video signals which were cut out when a plurality of original video signals were combined and broadcasted or edited can be uses.

For example, in Japanese Patent Application No. 53-138199 (Japanese Patent Kokai No.55-4489), there is disclosed an apparatus in which a moving image frame and a still image frame are mixed and ID signals of the moving image frame and still image frame are recorded by making frequencies of color bursts different and, when the still image frame is detected, a still image reproducing operation is executed in response to such a detection.

According to such a technique of mixing the still image frame into the moving image frame, however, the original video signals which were cut out by the edition cannot be used as a moving image.

SUMMARY OF THE INVENTION

It is an object of the invention to provide a recording and reproducing apparatus in which when a plurality of original video signals are switched and edited and one video signal is formed and recorded, a composite video signal such that at least a part of the cut-out original video signals can be easily uses and recorded and reproduced.

A video signal recording apparatus according to the invention comprises: sync signal generating means for generating vertical and horizontal sync signals; at least two video cameras for photographing synchronously with the vertical and horizontal sync signals and each for generating a video signal; switching command means for counting the vertical sync signals and generating at least one switching command signal of a length of a field unit each time only a predetermined number of vertical sync signals are counted; switching relay means for relaying one of the video signals during an absent period of time of the switching command signal and for relaying the other video signal during a present period of time of the switching command signal; ID signal producing means for generating a sub signal ID signal in response to the switching command signal and the vertical sync signal; synthesizing means for synthesizing a relay output of the switching relay means and the vertical and horizontal sync signals, thereby producing a composite video signal; and recording means for recording the composite video signal and the sub signal ID signal onto a recording medium.

A reproducing apparatus of a recording video signal according to the invention comprises: reading means for reading a composite video signal and a sub signal ID signal from a recording medium; sync separating means for separating a vertical sync signal from the composite video signal; extracting means for extracting the sub signal ID signal from a read signal by the reading means; switching pulse producing means for producing a switching pulse in accordance with the sub signal ID signal and the vertical sync signal; memory means for updating and storing the composite video signal during a present period of time of the switching pulse on at least a field unit basis; and reading and reproducing means for repeatedly reading and reproducing the video signals of the fields which were updated and stored in the memory means.

In the video signal recording and producing apparatus according to the invention, one of the video signals obtained from a plurality of video cameras is set to a main signal and the other is set to a sub signal. Several fields among a predetermined number of fields of the main signal and several fields of the sub signal are exchanged and recorded while keeping each time base. In the reproducing apparatus, when the main signal is reproduced, the recorded video signals are read and reproduced in an ordinary mode. When the reproduction of the sub signal is designated, the fields of the sub signals which intermittently exist are extracted and updated and stored. Each time they are updated, a still image is reproduced and the sub signal is reproduced like a frame transfer operation as a whole.

BRIEF DESCRIPTION OF THE DRAWINGS

FIGS. 3A to 3C are signal waveform diagrams showing the relation between an ID signal and a V sync signal in the recording apparatus in FIG. 1;

FIG. 4 is a block diagram showing a reproducing apparatus of a recording video signal according to the invention.

DETAILED DESCRIPTION OF THE PREFERRED EMBODIMENT

Figure 1:
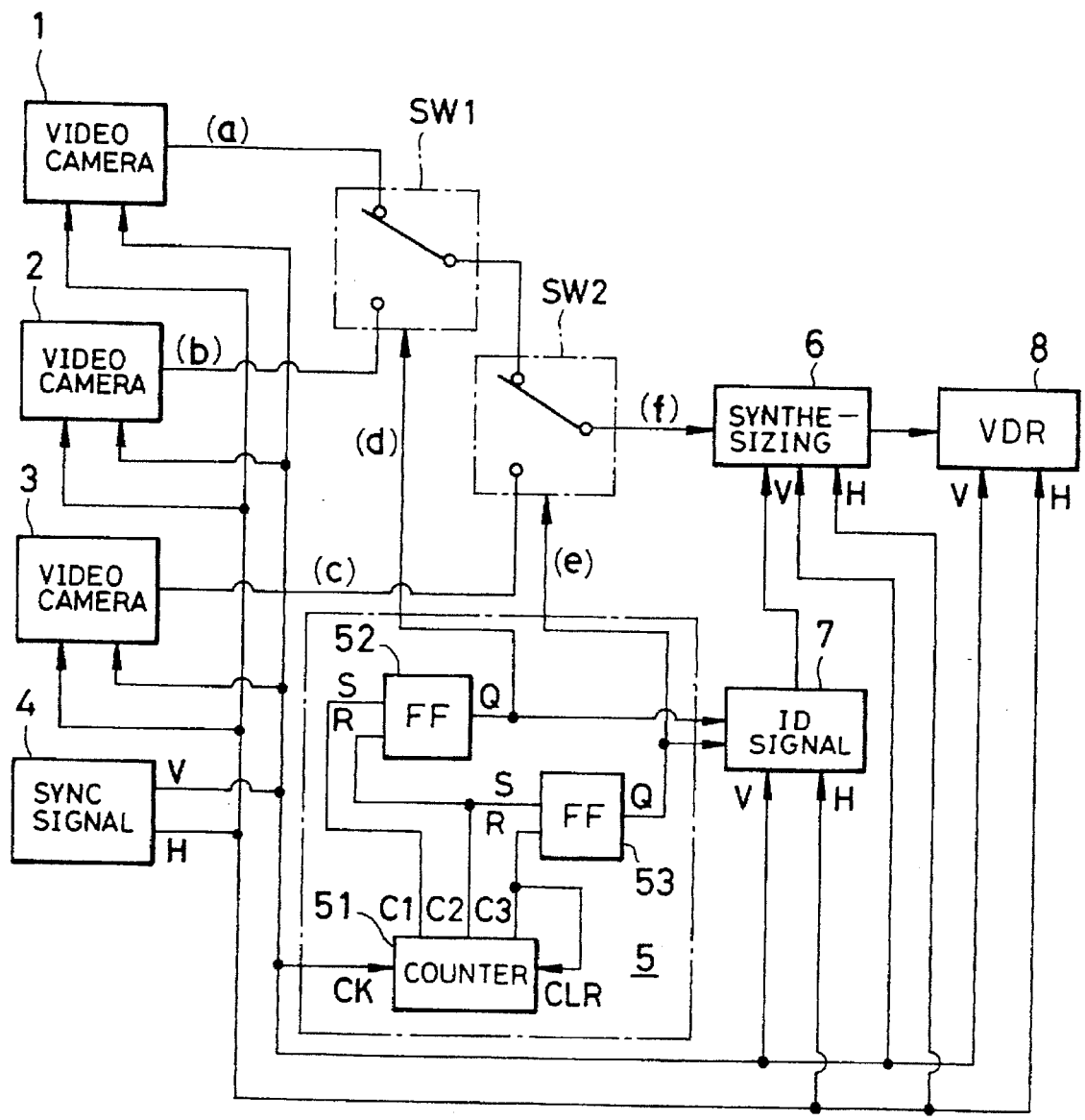
FIG. 1 is a block diagram showing a video signal recording apparatus according to the invention.

An embodiment of the present invention will now be explained hereinafter in detail with reference to the drawings with respect to the case where an edition is performed on a frame unit basis in an NTSC system in which one frame is formed by two fields.

In a video signal recording apparatus according to the invention shown in FIG. 1, video cameras 1, 2, and 3 photograph an object synchronously with a vertical sync signal (hereinafter, referred to as a V sync) and a horizontal sync signal (hereinlater, referred to as an H sync) which are supplied from a sync signal producing circuit 4 and produce video signals (a), (b), and (c), respectively. Change-over switching circuits SW1 and SW2 alternately relay the video signals to a synthesizing circuit 6 on a frame unit basis in accordance with switching signals (d) and (e) from a switching signal generating circuit 5.

The switching signal generating circuit 5 includes a counter 51 which receives the V sync and the H sync counts. For example, 20 front edges of the V sync and generates a first trigger signal to an output terminal C1. The counter 51 generates a second trigger signal to an output terminal C2 when it counts 21 V sync signals and generates a third trigger signal to an output terminal C3 when it counts 22 V sync signals.

An R-S flip-flop 52 receives a first trigger signal at a set terminal S and reverses it and generates a logic "1" signal, namely, switching signal (d) to a Q terminal until the second trigger signal is supplied to a reset terminal R. A flip-flop 53 receives the second trigger signal at a set terminal S and reverses it and generates a logic "1" signal, namely switching signal (e) to a Q terminal until the third trigger signal is supplied to a reset terminal R. Further, it is also considered to provide an additional circuit (not shown) and adjust pulse widths of the switching signals (d) and (e) using the H sync for the switching signal generating circuit 5.

An ID signal generating circuit 7 generates a first ID signal and a second ID signal corresponding to the switching signals (d) and (e) at timings in a proper H interval within a V blanking period after the V sync. The synthesizing circuit 6 forms so called a composite video signal by combining the V sync, H sync, and color burst signal (not shown) for the video signal which passed through the switching SW2. The ID signal generating circuit 7 also inserts the first ID signal into a predetermined H interval in the V blanking period just before the frame corresponding to the video signal (b) and also inserts the second ID signal into a predetermined H interval in the V blanking period just before the frame corresponding to the video signal (c). Further, logic signals such as "10" and "01" or the like can be also used as the first and second ID signals.

As mentioned above, the composite video signal including the ID signals formed by the synthesizing circuit 6 is supplied to a video disk recorder 8 as a recording apparatus. The video disk recorder 8 records the supplied composite video signal to a writable recording disk such as a magnetooptic disk or the like.

The operation of the video signal recording apparatus of FIG. 1 will now be described with reference to signal waveforms shown in FIGS. 2 and 3.

Figure 2A:
FIGS. 2A to 2F are signal waveform diagrams showing the relation between a main signal and a sub signal in the recording apparatus in FIG. 1.
Figure 2B:
Figure 2C:
Figure 2D:
Figure 2E:
Figure 2F:

The video signal (a) is formed by frames $F_M 1$, $F_M 2$, ... as shown in FIG. 2A. The video signal (b) is formed by $F_m 1$, $F_m 2$, ... as shown in FIG. 2B. The video signal (c) is formed by $F_n 1$, $F_n 2$, ... as shown in FIG. 2C. For a period of time during which the switching signal (d) in FIG. 2D exists, the switch SW1 operates and relays $F_m 9$ of the video signal (b) in FIG. 2B in place of the frame $F_M 9$ of the video signal (a). For a period of time during which the switching signal (e) in FIG. 2E exists, the switch SW2 relays the frame $F_n 10$ of the video signal (c) in place of the frame $F_M 10$. The video signals which were relayed by the switches SW1 and SW2 become the video signals such that one frame of each of the video signals (b) and (c) was inserted, for example, every 20 other frames of the video signal (a) as shown in FIG. 2F.

FIG. 3A enlargingly shows a pulse waveform of the first or second switching signal. FIG. 3B shows the V sync which exists in a time band within the pulse width of this switching signal. As shown in FIG. 3C, the first ID signal shown by a solid line or the second ID signal shown by a broken line appears in a predetermined H interval within the V blanking period after the V sync.

As mentioned above, there is obtained the composite video signal of a format such that the video signal (a) is set to the main signal and the video signal (b or c) is set to the sub signal and the frames of every other predetermined number of the main signal are substituted to the frames of the sub signal existing on almost the same time base as that of the main signal and the ID signals were inserted into the V blanking period of the frame just before the substituted frame. Such a composite video signal is recorded to a proper recording medium.

FIG. 4 shows a reproducing and display apparatus for reading the composite video signal which was recorded as mentioned above from a recording medium and for reproducing and displaying.

In the reproducing and display apparatus of FIG. 4, first, a composite video signal recorded by the recording apparatus of FIG. 1 is read out from a recording medium (not shown) by a recording medium playing apparatus 10 such as a video disk player or the like and is supplied to a fixed contact of a switch SW3. A sync signal separating circuit 11 separates and extracts the V sync and H sync from the composite video signal derived from the playing apparatus 10 and supplies to a system control circuit 12. An ID signal separating circuit 13 separates and extracts the ID signals in the composite video signal and supplies to the system control circuit 12. The system control circuit 12 previously receives a command to instruct whether the main signal should be reproduced or not and a command to instruct which one of the sub signals should be reproduced or not from the operator through a keyboard 14. The system control circuit 12 gives to the switch SW3 a switch drive signal to make the switch SW3 operative in accordance with the kind of ID signal which is supplied in response to such a command, thereby making the switch SW3 operative.

A breaking contact of the switch SW3 is directly connected to one terminal of an adder circuit 15. A making contact of the switch SW3 is connected to an input of an A/D converter 16. A frame which is relayed in the operation of the switch SW3 is converted into the digital value by an A/D converter 16 and is stored into a frame memory 18 through a memory control circuit 17. The memory control circuit 17 stores the digital signal from the A/D converter 16 into a desired memory address by memory control signal such as address designation signal, write command signal, read command signal, and the like from the system control circuit 12 and reads out the stored digital signal from the desired memory address and supplies to a D/A converter 19. The digital signal is converted into the analog signal by the D/A converter 19 and the analog signal is supplied to the adder circuit 15. The adder circuit 15 arithmetically adds two input signals which are supplied and supplies the resultant signal to a display apparatus 20. The display apparatus 20 has a construction similar to that of the ordinary monitor television apparatus and reproduces the analog video signal supplied. Although not shown, it is also considered to use a construction such that the V sync and H sync derived by the sync separating circuit 11 are supplied to the display apparatus 20.

The operation of the system control circuit 12 will now be described with reference to a flowchart of FIG. 5. Namely, in the system control circuit 12, first, a check is made to see if the sub signal should be reproduced or not (step S1). Since the command indicating whether the video signal (a), namely, main signal should be reproduced or not and the command indicating whether either the sub signal of the video signal (b) or the sub signal of the video signal (c) should be reproduced or not have previously been supplied from the keyboard 14 and stored in a predetermined memory as mentioned above, the system control circuit 12 judges the presence or absence of such a command.

If there is no reproducing command of the sub signal, a flag F is set to zero (step S2) and the memory reading control is cancelled (step S3). After that, the subroutine is finished. Since no switch driving signal is now supplied from the system control circuit 12, the composite video signal from the recording medium playing apparatus 10 is directly supplied to the display apparatus 10 through the adder circuit 15. The display apparatus 10, therefore, executes a reproducing process in an ordinary manner. In this case, as for the frames of the sub signal, since only one frame has intermittently been inserted, for example, for every 20 frames, the sub signal is not perceived by the eyes of an operator who observes the display apparatus but only the main signal is perceived.

In the case where the reproducing command of the sub signal has been supplied, the apparatus waits for the arrival of the V sync (step S4). When the V sync comes, the apparatus waits for the arrival of the ID signal (step S5). Since the reproducing command of the sub signal designates which one of the first and second sub signals should be reproduced, the apparatus waits for the arrival of the first or second ID signal corresponding to the first or second sub signal.

When the ID signal corresponding to the sub signal to be reproduced comes, the switch driving signal is produced in order to A/D convert the frame just after the ID signal and store the digital signal converted and the switch SW3 is made operative (step S6). While a command to execute the writing operation and a write address designation signal are supplied to the memory control circuit 17, a command to sequentially read out the frame signals written from the frame memory 18 is also supplied (step S7). The flag F is set to "1" (step S8) and the processing routine is returned to a main routine (not shown). The main routine is repetitively executed synchronously with a predetermined clock pulse.

Figure 5:
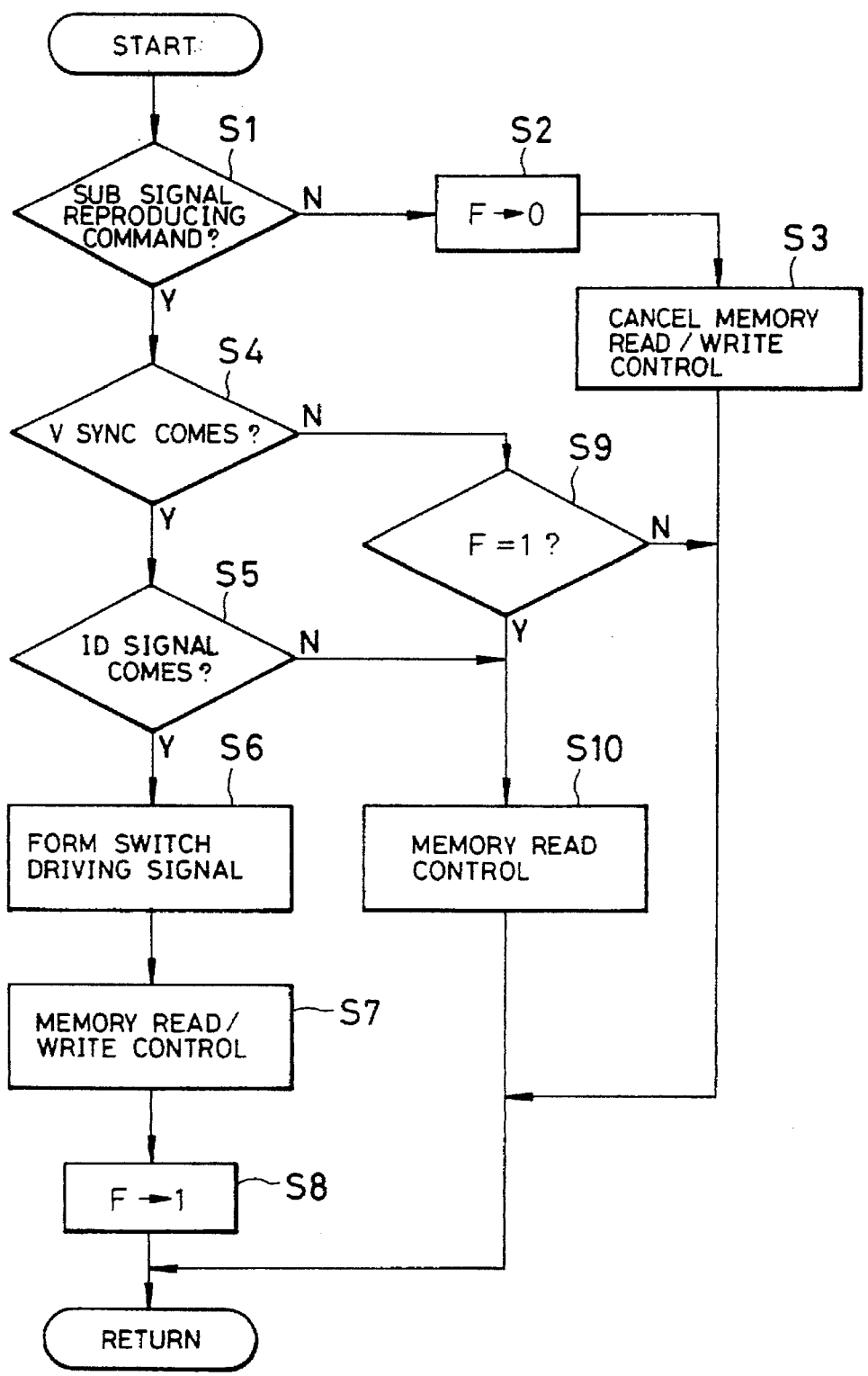
FIG. 5 is a flowchart showing the operation of the reproducing apparatus of FIG. 4.

The subroutine in FIG. 5 is executed by interrupting into the above main routine synchronously with a predetermined clock pulse. The subroutine is again executed at a next interruption timing. In this case, so long as the next V sync doesn't come, a check is made to see if the flag F is equal to "1" or not (step S9). When F=1, it is judged that the stored frame of the sub signal is at present being read out and reproduced, so that the memory reading control is continued and what is called a still reproducing mode is executed (step S10). When F=0, it indicates the case of the arrival of the first V sync after the reproducing command of the sub signal was received. In this state, the sub signal is not yet written into the frame memory 18. The memory reading control, therefore, is not performed but the subroutine is soon finished.

It is also possible to construct in manner such that the switch SW3 is not provided but the composite video signal from the playing apparatus 10 is always supplied to the A/D converter 16 and a selection switch for switching and supplying either one of the composite video signal from the playing apparatus 10 and the output signal of the D/A converter 19 to the display apparatus 20 is provided in place of the arithmetic circuit 15. By constructing such that either one of the sub signals is always updated and stored into the frame memory 18 even for a time interval during which the main signal is selected and reproduced, when the playing apparatus 10 is operated in the still image reproducing mode in order to pay attention to desired still image during the reproduction of the main signal, the still image and the sub signal just before can be freely switched and seen in comparison of them.

In the above embodiment, the video signal of the video camera 1 has been fixed. The video signal to be used as a main signal can be also changed every predetermined period. It is also considered to use a frame address as an ID signal.

To use a frame address as an ID signal, for example, a recording apparatus, a reproducing apparatus, and a recording medium in which an address management, namely, random access can be performed are used. When recording, after a series of recording operations were finished, the address information in which the main signal and sub signal were respectively recorded are recorded into a predetermined data area of the recording medium so as to be set to the ID signal. When reproducing, the address information is first read out and the operations similar to those mentioned above are successively executed while monitoring the reproduction addresses.

In the above embodiment, although the sub signal upon reproduction of the main signal is reproduced as an original signal, by controlling so as to keep a video image into a blank state or reducing the luminance by giving a command to the display apparatus 20 for the period of time of the sub signal, it is possible to make it more difficult to sense the sub signal.

As will be obviously understood from the above description, in the recording and reproducing apparatus of the video signal according to the present invention, one of the video signals which are derived from the video cameras is set to the main signal, the video signal which is derived from another video camera is set to the sub signal, the field of the sub signal is intermittently interposed every predetermined number of fields of the main signal, and the video signals while keeping the position on the time base of the filed of the sub signal almost constant are obtained and recorded. As for the reproduction of the main signal, the recorded video signal is reproduced by an ordinary reproducing process. On the other hand, as for the reproduction of the sub signal, the sub signal field is stored into the memory while detecting the ID signal or by the ID signal which has previously been detected, and the still image reproducing operation is continued until the next sub signal field is fetched. According to the recording and reproducing apparatus of the video signal according to the present invention, the reproduction of the main signal can be accomplished by the ordinary video signal reproducing process without using any memory. The sub signal, on the other hand, can be reproduced and displayed like a frame sending. Moreover since the sub signal is frame sent in a state in which the time base is not largely deviated from the time base of main signal, a specific scene (for instance, throwing motion of the pitcher) is recorded as a sub signal while recording a large stream scene by the main signal and the frame sending can be realized in the sub signal reproducing mode. It is, consequently, convenient because the sub signal can be easily taken out from the main signal and reproduced.

What is claimed is:

1. A recording apparatus for a video signal comprising:
   sync signal generating means for generating vertical and horizontal sync signals;

at least two video cameras for photographing synchronously with said vertical and horizontal sync signals, each of said video cameras generating a video signal;

switching command means for counting said vertical sync signal and generating at least one switching command signal having a length of a field unit each time a predetermined number of said vertical sync signals are counted, wherein said predetermined number is greater than one;

switching relay means for relaying a video signal from one of said video cameras as a main signal when the switching command signal is not present and for relaying a video signal from a different video camera as a subsidiary signal when a switching command signal is present so as to produce a compound signal including said main signal and said subsidiary signal, wherein the switching command signal is present for a sufficiently short period of time relative to a period of time that the switching command signal is not present so that said subsidiary signal is not visually perceivable when said compound signal is displayed on a display screen;

ID signal producing means for producing a sub signal ID signal in response to said switching command signal and said vertical sync signal;

synthesizing means for synthesizing a relay output of said switching relay means, said vertical sync signals, and said horizontal sync signals, thereby producing a composite video signal; and recording means for recording said composite video signal and said sub signal ID signal onto a recording medium.

2. An apparatus according to claim 1, wherein said recording medium is a video disk.

3. An apparatus according to claim 1, wherein said switching command means counts the vertical sync signal and generates at least said one switching command signal having the length of the field unit each time 40 vertical sync signals are counted.

4. An apparatus according to claim 3, wherein said recording medium is a video disk.

5. The apparatus according to claim 1, further comprising:

reading means for reading a composite video signal and a sub signal ID signal from the recording medium;

sync separating means for separating the vertical sync signal from the composite video signal;

extracting means for extracting the sub signal ID signal from a signal read out by the reading means;

switching pulse producing means for producing a switching pulse in response to the sub signal ID signal and the vertical sync signal;

memory means for updating and storing the composite video signal for a presence period of time of the switching pulse on at least a field unit basis; and read-out reproducing means for repeatedly reading the video signals of the fields which were updated and stored in the memory means and reproducing the video signals.

6. A recording and reproducing apparatus for a video signal, comprising:

sync signal generating means for generating vertical and horizontal sync signals;

at least two video cameras for photographing synchronously with said vertical and horizontal sync signals, each of said video cameras generating a video signal;

switching command means for counting said vertical sync signal and generating at least one switching command signal having a length of a field unit each time a predetermined number of vertical sync signals are counted, wherein said predetermined number is greater than one;

switching relay means for relaying a video signal from one of said video cameras as a main signal when the switching command signal is not present and for relaying a video signal from a different video camera as a subsidiary signal when a switching command signal is present so as to produce a compound signal including said main signal and said subsidiary signal, wherein the switching command signal is present for a sufficiently short period of time relative to a period of time that the switching command signal is not present so that said subsidiary signal is not visually perceivable when said compound signal is displayed on a display screen;

ID signal producing means for producing a sub signal ID signal in response to said switching command signal and said vertical sync signal;

synthesizing means for synthesizing the compound signal produced by said switching relay means, said vertical sync signals, and said horizontal sync signals, thereby producing a composite video signal;

recording means for recording said composite video signal and said sub signal ID signal onto a recording medium;

reading means for reading said composite video signal and said sub signal ID signal which were recorded on said recording medium;

sync separating means for separating said vertical sync signal from said composite video signal;

extracting means for extracting a sub signal ID signal from a signal read out by said reading means;

switching pulse producing means for producing a switching pulse in response to said sub signal ID signal and said vertical sync signal;

memory means for updating and storing said composite video signal for a presence period of said switching pulse on at least a field unit basis; and read-out reproducing means for repeatedly reading the video signals of the fields which were updated and stored in said memory means and reproducing said video signals.

* * * * *